US007250963B2

(12) United States Patent
Yuri et al.

(10) Patent No.: US 7,250,963 B2
(45) Date of Patent: Jul. 31, 2007

(54) MICROSCOPIC IMAGE CAPTURE APPARATUS

(75) Inventors: Kiyoshi Yuri, Tokyo (JP); Shuji Nakagawa, Tokyo (JP); Tatsuki Yamada, Tokyo (JP)

(73) Assignee: Olympus Corporation, Tokyo (JP)

( * ) Notice: Subject to any disclaimer, the term of this patent is extended or adjusted under 35 U.S.C. 154(b) by 855 days.

(21) Appl. No.: 10/320,132

(22) Filed: Dec. 16, 2002

(65) Prior Publication Data

US 2003/0112330 A1 Jun. 19, 2003

(30) Foreign Application Priority Data

Dec. 19, 2001 (JP) ............................. 2001-385676
Nov. 7, 2002 (JP) ............................. 2002-323428

(51) Int. Cl.
*H04N 7/18* (2006.01)
*H04N 9/47* (2006.01)

(52) U.S. Cl. ...................................................... 348/79
(58) Field of Classification Search ..................... None
See application file for complete search history.

(56) References Cited

U.S. PATENT DOCUMENTS 3,856,398 A * 12/1974 Taylor ........................ 355/63

6,282,020 B1 * 8/2001 Ogino ......................... 359/385
6,804,049 B2 * 10/2004 Ogino et al. ................. 359/368

FOREIGN PATENT DOCUMENTS

| JP | 5-215969 | * | 8/1993 |
| JP | 5-215969 | A | 8/1993 |
| JP | 9-281405 | A | 10/1997 |
| JP | 2000-501844 | A | 2/2000 |
| JP | 2000-295462 | A | 10/2000 |
| JP | 2002-148526 | A | 5/2002 |
| WO | WO 97/04347 | A1 | 2/1997 |

* cited by examiner

*Primary Examiner*—Nhon Diep
(74) *Attorney, Agent, or Firm*—Frishauf, Holtz, Goodman & Chick, P.C.

(57) ABSTRACT

The microscopic image capture apparatus includes: a slide glass transfer unit 17 transfers a slide glass 10 from a first slide glass storage unit 16 to a space under a microscope objective lens 11; a wide field-of-view image capture unit 60 captures the entire image of wide field-of-view of the slide glass 10 in synchronization with the transfer of the slide glass 10 by the slide glass transfer unit 17; a microscopic image capture unit 14 captures a microscopic image of the sample S on the slide glass 10 whose entire image of wide field-of-view has been captured by the wide field-of-view image capture unit 60; and a slide glass storage unit 18 stores the slide glass 10 whose sample S has been captured by the microscopic image capture unit 14 from the observation position of the microscope 11 into the second slide glass tray unit 19.

17 Claims, 15 Drawing Sheets

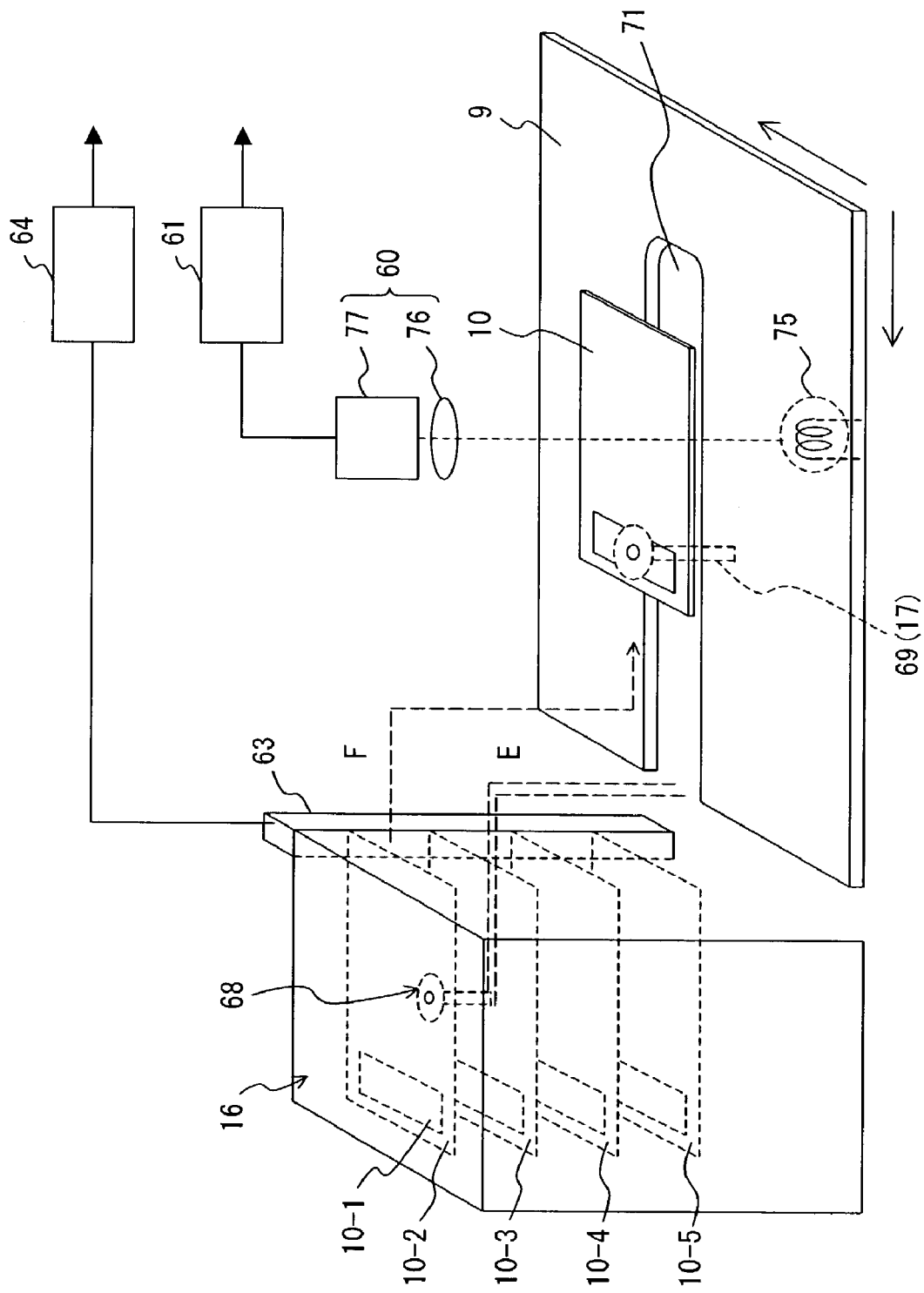
F I G. 2

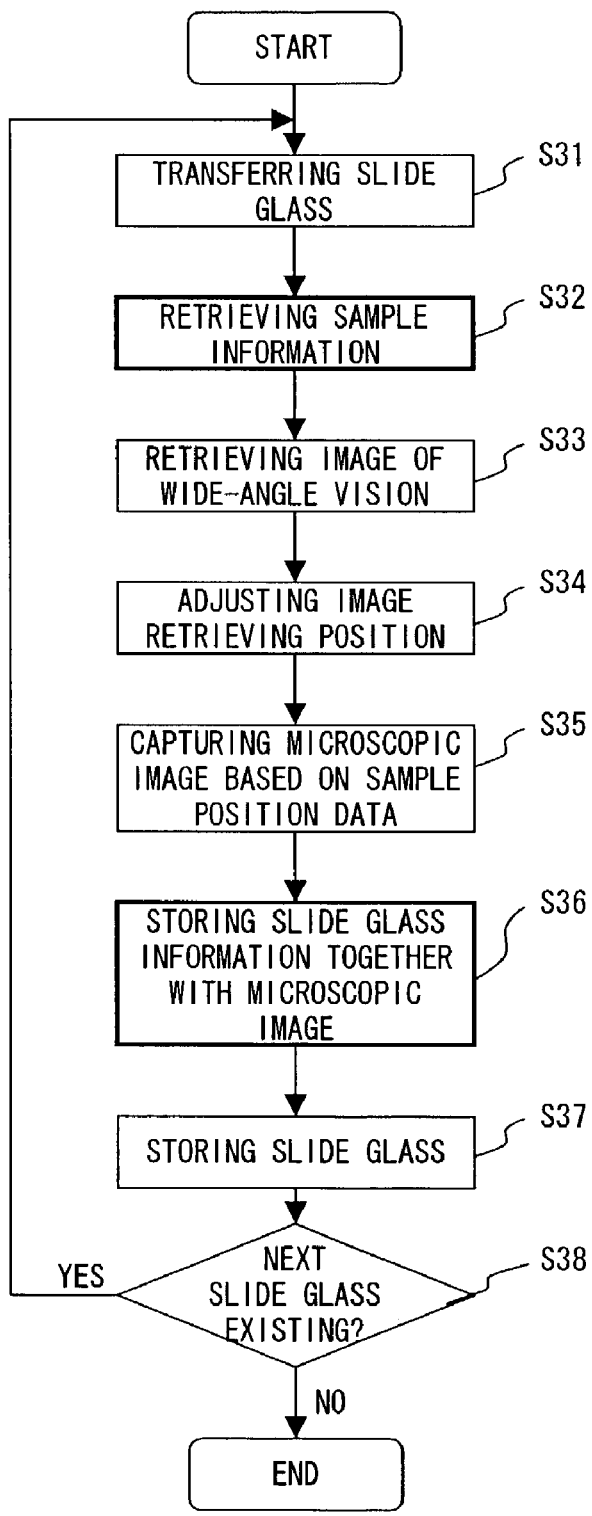
F I G. 5

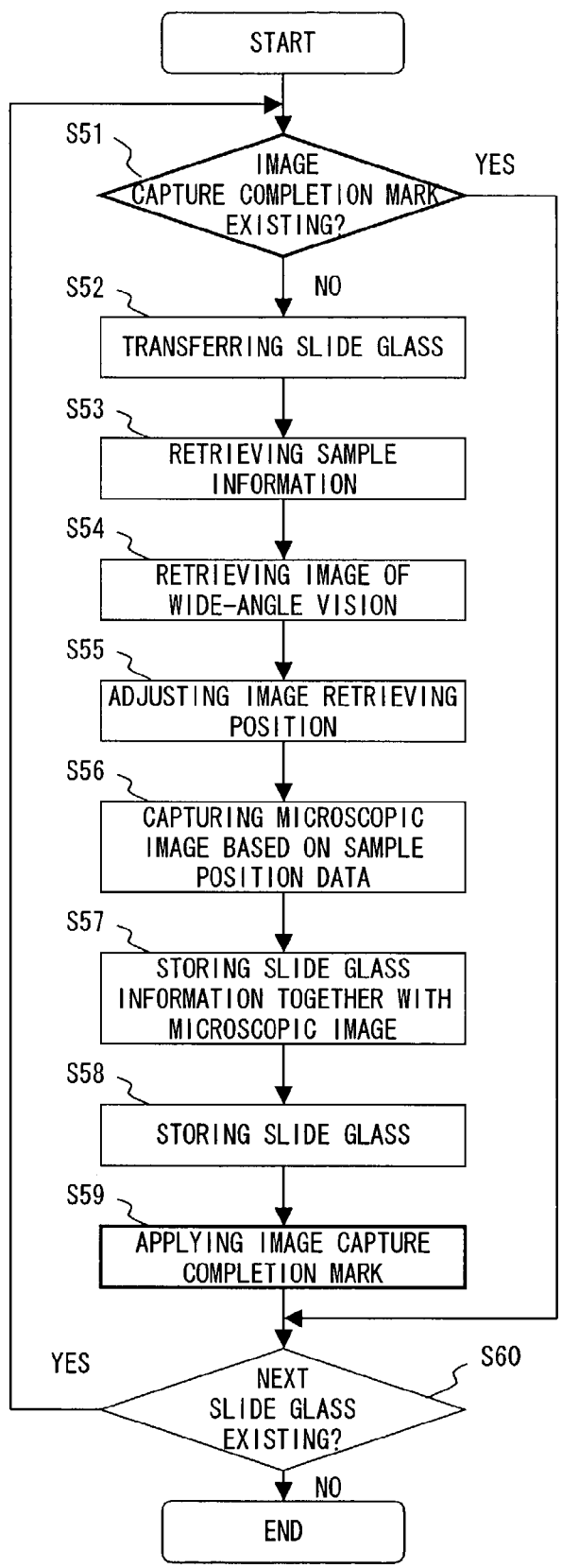
F I G. 6

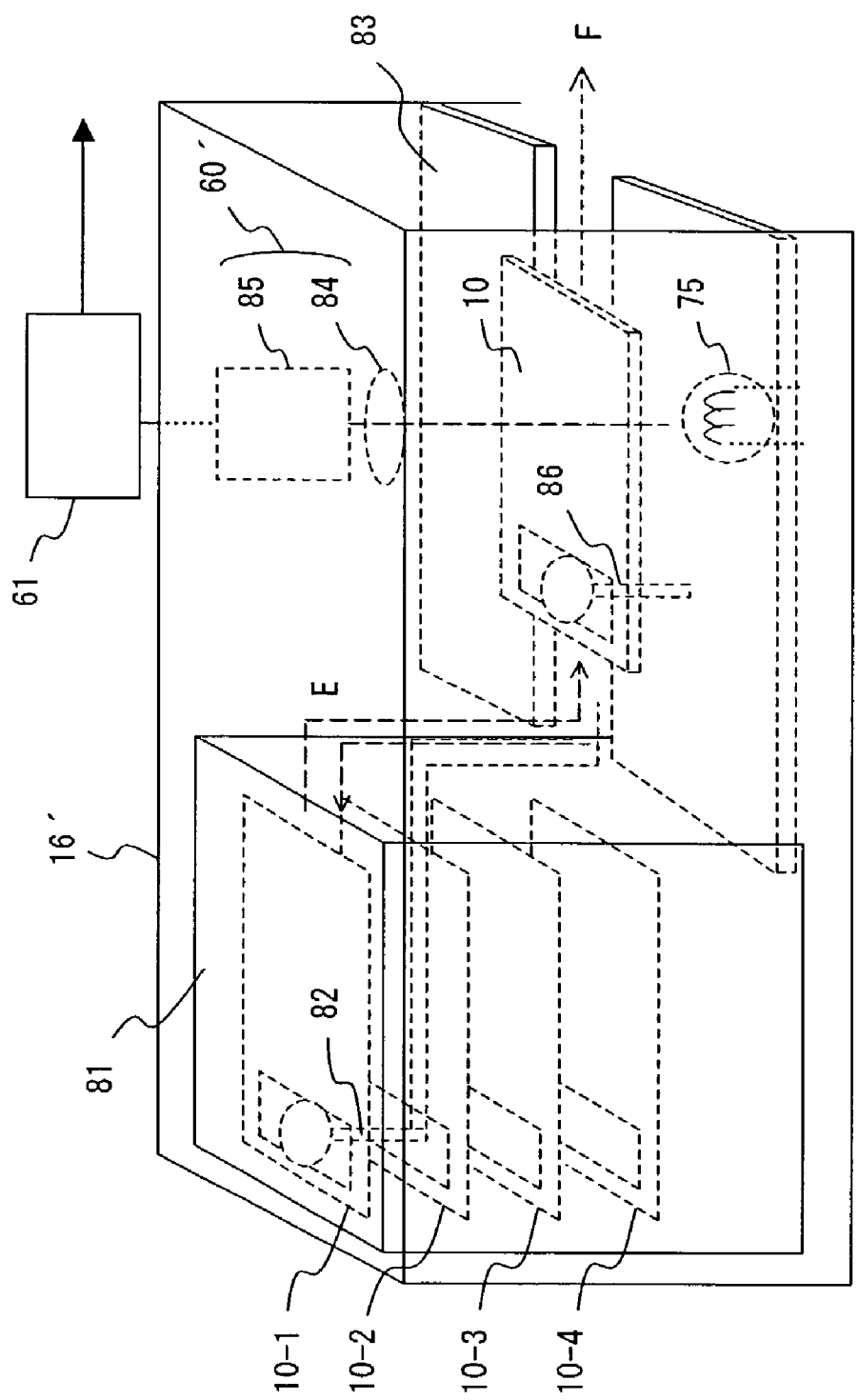
F I G. 8

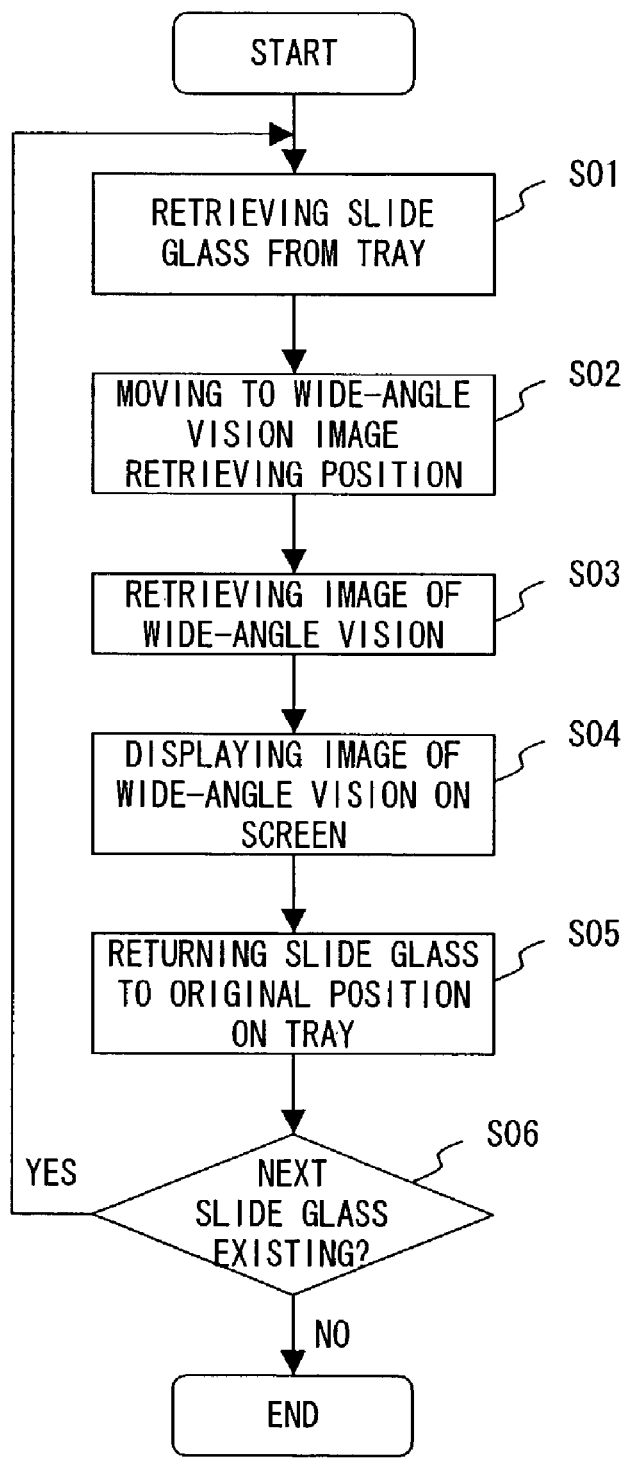
F I G. 1 2

MICROSCOPIC IMAGE CAPTURE APPARATUS

BACKGROUND OF THE INVENTION

1. Field of the Invention

The present invention relates to an apparatus and a method for capturing a microscopic image of a sample, and a program therefor.

2. Description of the Related Art

Conventionally, a microscopic image capture apparatus has been used to capture a biological sample such as a human cell, etc. under magnification. To observe or capture a sample using a microscope, the sample is first put and fixed on a slide glass, the sample on the slide glass is set under the objective lens of the microscope, correct focus is obtained, and then an obtained image (microscopic image) is observed or captured.

However, the microscopic image is obtained by magnifying the sample to tens or hundreds times it's actual size, thereby exceedingly narrowing the view. Therefore, it is not easy to search for the sample position on the slide glass or the portion of the sample to be observed while moving horizontally and vertically within the narrow view.

As a result, normally, an image of wide field-of-view is generated by capturing the entire slide glass before capturing a desired microscopic image, and using the obtained image, the sample position on the slide glass or the portion to be observed is examined in advance.

For example, based on the above mentioned microscopic image of wide field-of-view, the technology of automatically recognizing the location of the sample to be captured on the slide glass has been suggested. (For example, refer to the abstract and FIG. 1 of Japanese Patent Publication No. 2000-295462).

Additionally, for example, to simplify the management of a slide glass and sample information in the pathological inspection, etc., there has been the technology of recording sample information by magnetic means on the slide glass or using a bar code, etc. and reading the recorded data using a reader. (for example, refer to the abstract and FIG. 1 of Japanese Patent Publication No. 05-215969).

Normally, capturing a microscopic image in a hospital and a research institute is performed on samples generated on a large number of slide glasses, and it is demanded that the capturing operation on the large number of microscopic images, and the recording and management of the sample information can be efficiently performed. However, there has not been prominent means suggested, and any efficient means has long been awaited to solve the above mentioned problem.

However, the technology of automatically recognizing the sample position on the slide glass using the image of wide field-of-view does not describe the precondition, that is, efficient capturing the image of wide field-of-view.

Likewise, the technology of simplifying the management of the above mentioned slide glass and sample information describes only recording and reading information onto the slide glass, but describes no efficient methods for recording and reading the information.

Furthermore, the technology of providing an exclusive optical system in addition to the optical system for obtaining an image of a high magnification for efficiently capturing an image of wide field-of-view describes no methods for efficiently capturing an image of wide field-of-view when plural pieces of slide glasses are observed.

In a normal microscope system, a slide glass storage unit stores plural pieces of slide glasses, and the slide glasses are transferred from the slide glass storage unit so that a microscopic image can be captured. However, when the contents of the slide glasses stored in the slide glass storage unit are checked, it is necessary to retrieve the slide glasses back from the slide glass storage unit, thereby requiring bothersome operations.

SUMMARY OF THE INVENTION

The microscopic image capture apparatus according to the present invention includes: a slide glass transfer unit for transferring a slide glass from the first slide glass tray unit into the space under the microscope objective lens (the space under the microscope objective lens is the observation position of the microscope); a wide field-of-view image capture unit for capturing an entire image of wide field-of-view of the slide glass in synchronization with the transfer of the slide glass by the slide glass transfer unit; a microscopic image capture unit for capturing a microscopic image of a sample on the slide glass on which the entire image of wide field-of-view has been captured by the wide field-of-view image capture unit; and a slide glass storage unit for storing the slide glass on which the sample has been captured by the microscopic image capture unit from under the microscope objective lens to the second slide glass tray unit.

The microscopic image capture apparatus can also be configured such that the wide field-of-view image capture unit is provided in the slide glass storage unit, and the entire image of wide field-of-view of the slide glass can be captured in the slide glass storage unit.

BRIEF DESCRIPTION OF THE DRAWINGS

FIG. 2 is an oblique view of a type of configuration of the main portion including a transfer system of a slide glass of the microscopic image capture apparatus according to an embodiment of the present invention;

FIG. 5 is a flowchart for explanation of an operation of capturing a microscopic image according to the second embodiment of the present invention;

FIG. 6 is a flowchart for explanation of an operation of capturing a microscopic image according to the third embodiment of the present invention;

FIG. 8 is an oblique view of the transfer of a slide glass and a type of configuration of only the main portion including the wide field-of-view image capture system in the configuration according to the fourth through sixth embodiments of the present invention;

FIG. 12 is a flowchart of the operations processed according to the fourth embodiment of the present invention;

DESCRIPTION OF THE PREFERRED EMBODIMENTS

The embodiments of the present invention are described below in detail by referring to the attached drawings.

Figure 1:
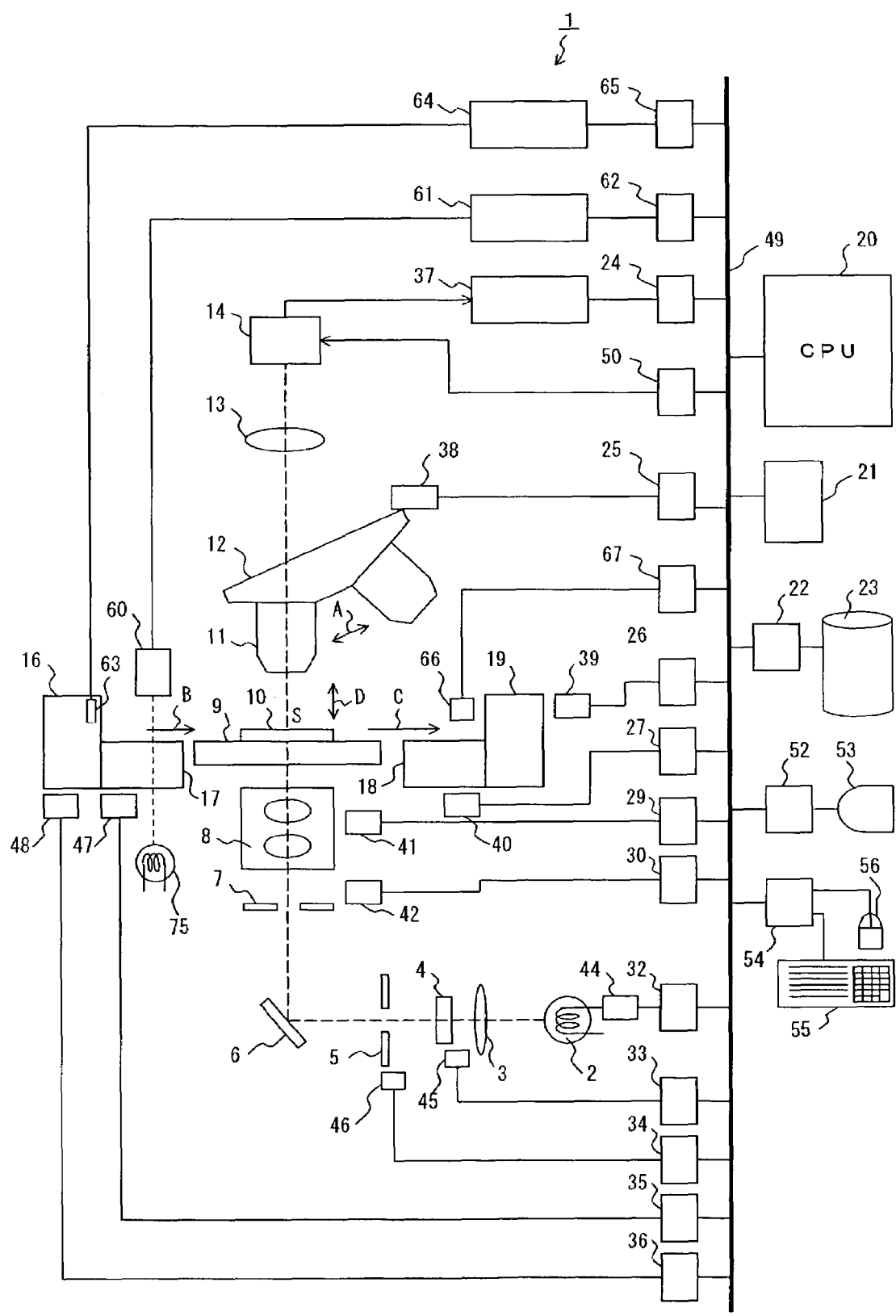
FIG. 1 shows the type of entire configuration of the microscopic image capture apparatus according to an embodiment of the present invention.

FIG. 1 shows a type of entire configuration of the microscopic image capture apparatus according to the embodiments of the present invention. A microscopic image capture apparatus 1 generates illuminating light from a transmitted illumination light source 2 of, for example, a halogen lamp. The illuminating light is first collected by a collector lens 3 as indicated by the broken lines shown in FIG. 1, and then tended toward a stage 9 by a mirror 6 through various filters 4 formed by, for example, an ND filter, an LBD filter, etc. and a field stop 5, The illuminating light tended toward the stage 9 by the mirror 6 penetrates through a aperture stop 7 and a condenser lens unit 8, and then through a light aperture (not shown in FIG. 1) of the stage 9, thereby illuminating the sample S of the slide glass 10 on the stage 9.

Above the stage 9, a revolver 12 holding a plurality of microscope objective lens 11 is provided. By rotating the revolver 12 in any direction as indicated by the arrow A shown in FIG. 1, the microscope objective lens 11 of a desired magnification can be placed in an observation position.

These microscope objective lens 11 can be freely exchanged on the revolver 12. Therefore, the revolver 12 can be not only rotated, but also the microscope objective lens 11 can be exchanged for the revolver 12, thereby obtaining a desired magnification.

The above mentioned stage 9 is configured such that it can be hoisted/lowered in the Z direction (vertically) as indicated by the two-headed arrow D shown in FIG. 1. However, the focus control is not limited to the hoisting/lowering drive of the stage 9, but it is obvious that the revolver 12 holding the microscope objective lens 11 can be hoisted/lowered in the Z direction.

In the present embodiment, the focus control is not specifically explained. However, for example, the correction data in the Z direction can be stored in memory 21, etc., a process of automatically achieving focus is performed in real time, a process of automatically achieving focus can be performed only once when it is necessary, and then fixed, etc. These controlling operations can be easily performed using the functions designed for the microscopic image capture apparatus.

Furthermore, there is a case that the brightness of an image is different due to the capturing position on the slide glass 10. The brightness of an image can be controlled by fixing the exposure by a camera unit 14 from a CPU 20, or by performing an entire adjustment by correcting the brightness level by software.

Thus, the sample image of the slide glass 10 input into the microscope objective lens 11 positioned on the optical axis within the observation optical path is configured to be led to the camera unit 14 through an intermediate magnification lens 13.

In FIG. 1, the sample image is led to the camera unit 14 only. However, although it is not shown in FIG. 1, the sample image can be branched to the eyepiece by the beam splitter so that the sample image can also be observed by the eyepiece. However, since the microscopic image capture apparatus 1 aims at digitizing a microscopic image, it is not necessary to provide the eyepiece mainly for observation by the naked eye.

In FIG. 1, the sample image captured by the camera unit 14 is digitized by compression in the specification of the JPEG format by an image process board 37.

The microscopic image capture apparatus 1 is provided with slide glass storage units 16 and 19 capable of storing a plurality of slide glasses, and slide glass transfer units 17 and 18. A predetermined slide glass 10 is retrieved from the slide glass storage unit 16 by the slide glass transfer unit 17, and the retrieved slide glass 10 is transferred to the stage 9.

The slide glass storage unit 16 is provided with a dot matrix code reader 63. When the slide glass 10 is retrieved by the slide glass transfer unit 17, the above mentioned dot matrix code reader 63 can read the sample information recorded by a dot matrix code on the side of the slide glass 10.

When the slide glass transfer unit 17 transfers the slide glass 10 to the objective position on the stage 9 under the microscope objective lens 11 by the path indicated by the arrow B shown in FIG. 1, the entire image of wide field-of-view is captured by a linear image sensor unit 60.

In FIG. 1, after the image is observed under magnification through the microscope objective lens 11, the slide glass transfer unit 18 transfers the slide glass 10 under the microscope objective lens 11 as shown by the arrow C, and the slide glass 10 is stored in the slide glass storage unit 19.

The slide glass transfer unit 18 is provided with a captured image recording apparatus 66 so that the microscopic image can be recorded as image capture information including, for example, an image identification number, the number of pieces, the capture date, etc. to clearly indicate that the microscopic image has been captured. A recording method can be recording information on a hard disk and other appropriate storage medium, and recording a dot matrix code, etc. on the slide glass itself, in the space of the label on the top surface, or directly on the slide glass using a jet recording device.

In the example shown in FIG. 1, the slide glass storage unit 16 before capturing an image and the slide glass storage unit 19 are configured as separate units. However, the slide glass storage units 16 and 19 can be processed as one unit, the slide glass transfer units 17 and 18 can be processed as one unit, and the slide glass 10 is transferred by the slide glass transfer unit to and from the slide glass storage unit so that the slide glass 10 can be captured under the microscope objective lens 11, and then returned to the slide glass storage unit.

The CPU 20 controls the operations of the microscope such as transferring the slide glass 10 by the slide glass transfer units 17 and 18, capturing an image of wide field-of-view by the linear image sensor unit 60, capturing a microscopic image by the camera unit 14, moving the stage 9 horizontally and vertically on the stage 9, automatically achieving focus, etc.

The CPU 20 loads the control program recorded on the storage medium 22 onto the memory 21, and controls each unit according to the loaded control program. In the control program, an operation control screen display program for display of an operation control screen on the operation monitor 53 is implemented such that an operator of the microscopic image capture apparatus 1 can easily control the microscopic image capture apparatus 1.

The operator can operate a keyboard 55 or a mouse 56 in inputting a necessary instruction to operate a microscope, transfer a slide glass, fetch a microscopic image, capture an image of wide field-of-view, etc.

The above mentioned units and each of the units described below are connected to the CPU 20 through exclusive drivers of an interface circuit (hereinafter referred to as an I/F circuit) and each unit, and also through a CPU bus 49.

For example, to the CPU bus 49, an image process board control I/F circuit 24, a revolver control I/F circuit 25, slide glass storage control I/F circuits 26 and 36, stage transfer I/F circuits 27 and 35, a condenser unit control I/F 29, a あぺaperture stop control I/F circuit 30, a light source control I/F circuit 32, a filter control I/F circuit 33, a field stop control I/F circuit 34, a camera unit control I/F circuit 50, a wide field-of-view image camera control I/F circuit 62, dot matrix code reader control I/F circuit 65, a captured image record control I/F circuit 67, etc. are connected.

The CPU 20 issues a control signal to each unit through each of the interface circuits connected to the CPU bus 49, and controls each of the above mentioned units.

For example, as for the control of the illuminating light of a microscope, the CPU 20 controls an analog voltage value change circuit 44 through the light source control I/F circuit 32. Under the control, the analog voltage value change circuit 44 changes the voltage of the illuminating lamp, thereby controlling the illuminating light.

Furthermore, the memory 21, a storage medium 22 such a hard disk, etc., a large capacity storage medium 23 formed by a DVD, RAM, etc. exceeding tens of gigabytes are connected to the CPU bus 49. Furthermore, screen display memory 52 is connected between the CPU bus 49 and the operation monitor 53, and the operation monitor 54 for control of an event of the keyboard 55 and the mouse 56 is connected to the CPU bus 49.

Each unit is provided with an exclusive driver (drive system) for electrically driving the unit. The exclusive driver is configured by, for example, an exclusive unit motor, a motor driver, a drive transfer system, etc. which are incorporated into one system. These exclusive drivers are connected to the CPU 20 through an exclusive control I/F circuit and the CPU bus 49.

For example, a revolver turning driver 38 comprising a revolver rotation motor, a motor driver, and a drive transfer system is provided for the revolver 12. Likewise, slide glass storage drivers 48 and 39, stage transfer unit driver 47 and 40, a aperture stop driver 42, a condenser lens driver 41, a field stop driver 46, various filter control drivers 45, etc. are connected to the corresponding units.

The microscopic image capture apparatus 1 is provided with the minimal number of sensors (not shown in the attached drawings) in the corresponding positions so that each unit can correctly perform operations of moving to a predetermined position, rotation, etc. For example, the revolver 12 is provided with an objective optical axis position sensor so that rotation can set a correct stop in the objective optical axis position.

The stage 9 can slide at least in the two axis directions, that is, in the X and Y axis directions (horizontal and back and forth in FIG. 1), and has the function of transferring a slide glass between the slide glass transfer unit 17 and the stage 9.

FIG. 2 is an oblique view of a type of configuration of the slide glass transfer system and the main portion according to the present invention. As shown in FIG. 2, the slide glass storage unit 16 is configured to store a plurality of slide glasses 10 (10-1, 10-2, . . . , 10-5). The slide glass storage unit 16 is provided with a transferring adsorptive device 68. The transferring adsorptive device 68 fetches the slide glasses 10 stored in the slide glass storage unit 16 piece by piece using an adsorptive nozzle and an adsorptive pad at the tip, moves each piece to the transfer position to a stage adsorptive device 69 of the slide glass transfer unit 17 as indicated by the arrow E by the broken lines shown in FIG. 2, and transfers the slide glass 10 as indicated by the arrow F.

The transferring adsorptive device 68 is connected to a vacuum pump (not shown in FIG. 2) through a tube (not shown in FIG. 2), and has the adsorption enough to adsorb and hold at least one slide glass 10 and transfer it to the stage adsorptive device 69 of the slide glass transfer unit 17.

On the stage 9 shown in FIG. 1, an adsorptive portion moving guide hole 71 is formed from the transfer side end of the slide glass 10 to the center of the stage as shown in FIG. 2. As described above, the stage adsorptive device 69 of the slide glass transfer unit 17 which takes over the transfer of the slide glass 10 from the transferring adsorptive device 68 is led by the adsorptive portion moving guide hole 71, and moves the slide glass 10 into the position of the optical axis below the microscope objective lens 11 on the right outside the figure.

The slide glass storage unit 16 is provided with the dot matrix code reader 63 also shown in FIG. 1. When the slide glass 10 is retrieved from the slide glass storage unit 16 by the transferring adsorptive device 68 as described above, the sample information recorded in the dot matrix code on the side of the slide glass 10 is read by the dot matrix code reader 63.

Figure 3:
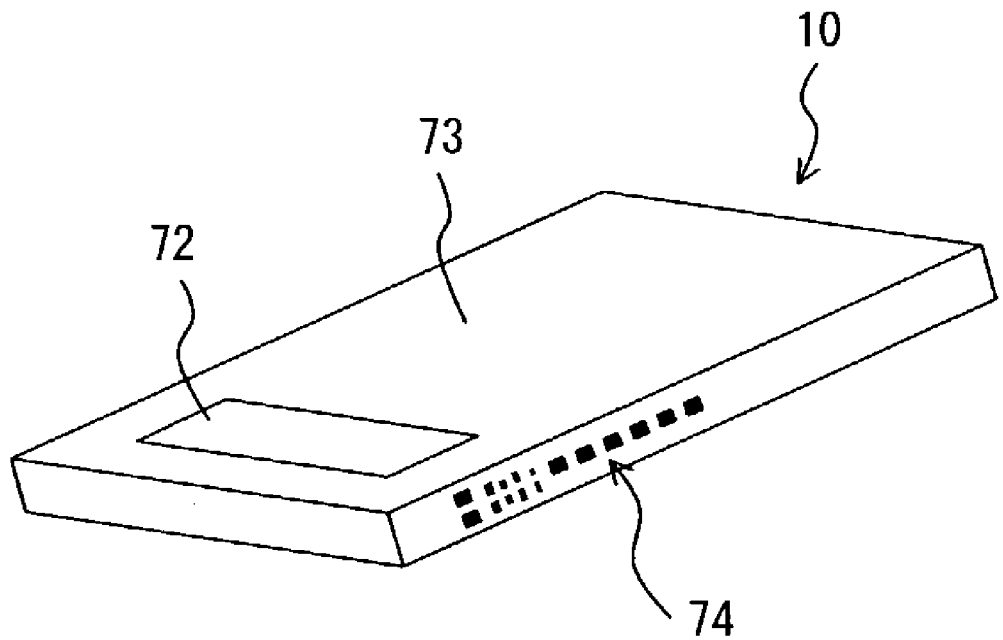
FIG. 3 is an oblique view of a type of slide glass under magnification.

FIG. 3 is an oblique view of the slide glass 10 under magnification. As shown in FIG. 3, an identification label 72 is attached to one end of the top surface of the slide glass 10, and a sample can be placed on the remaining major portion, that is, a sample area 73. The sample is not specifically shown in FIG. 3, but is placed at the corner or in a small central area of the sample area 73 if it is small, and is placed covering the entire area of the sample area 73 if it is large.

On the side surface of the slide glass 10, the information about the sample equal to or more than the description of the identification label 72 on the top surface of the slide glass 10 is recorded in a dot matrix code 74. The identification label 72 is used for visual recognition only, and the dot matrix code 74 is used for management as electronic data.

These pieces of sample information are, for example, a management number of a slide glass, a facility name relating to a sample such as a hospital, a research institute, etc., a name of an internal organ, sex of a patient related to a sample, age of a patient, information about whether or not a microscopic image has been captured, etc.

The record of the sample information is not limited to the dot matrix code. For example, the information can be magnetically recorded and read by a magnetic reader.

In any case, a dot matrix code signal read by the dot matrix code reader 63 is converted into the sample information of digital data by a code data process device 64, transmitted to the CPU 20 through the dot matrix code reader control I/F circuit 65 and the CPU bus 49 shown in FIG. 1, and stored by the CPU 20 in the large capacity storage medium 23 as associated with the microscopic image described later, and the data of an image of wide field-of-view.

Furthermore, as shown in FIG. 2, an illuminating light source 75 for capture of an image of wide field-of-view is placed below the transfer path of the stage 9, and the linear image sensor unit 60 shown in FIG. 1 and comprising a converging lens 76 and a linear image sensor 77, and an analog-digital signal process device 61 is connected to the linear image sensor unit 60.

With the configuration, while the stage adsorptive device 69 of the slide glass transfer unit 17 transfers the slide glass 10 to the objective position on the optical axis below the microscope objective lens 11 along the adsorptive portion moving guide hole 71 of the stage 9, the illuminating light source 75 illuminates the slide glass 10 from below, the converging lens 76 collects the penetrated light from the illuminated slide glass 10, and the linear image sensor 77 scans line by line an image formed by the collected light. The analog line scan signal is transmitted to a analog-digital signal process device 61, and the analog-digital signal process device 61 converts the analog line scanning signal into a digital line scanning signal, and transmits the converted digital line scanning signal to the CPU 20 through the wide field-of-view image camera control I/F circuit 62 and the CPU bus 49.

The CPU 20 forms an image using a digital line scanning signal sequentially received from the analog-digital signal process device 61 as raster data, displays the image on the operation monitor 53 shown in FIG. 1 as a two-dimensional image of wide field-of-view, associates it with the sample information obtained by reading the dot matrix code, and stores the result in a predetermined storage area of the large capacity storage medium 23.

Then, a microscopic image is captured as described later in detail, and the capture information and the sample information are recorded by the control by the CPU 20 as described above.

Thus, with the above mentioned configuration, the microscopic image capture apparatus 1 can control all units through the CPU 20, and the operator can control any unit by operating the keyboard 55 or the mouse 56 while watching the control screen displayed on the operation monitor 53, and can perform a desired operation to manage a number of slide glasses 10.

Described below is the operation of the controlling process by the CPU 20 of the microscopic image capture apparatus 1 with the above mentioned basic configuration according to the first embodiment.

Figure 4:
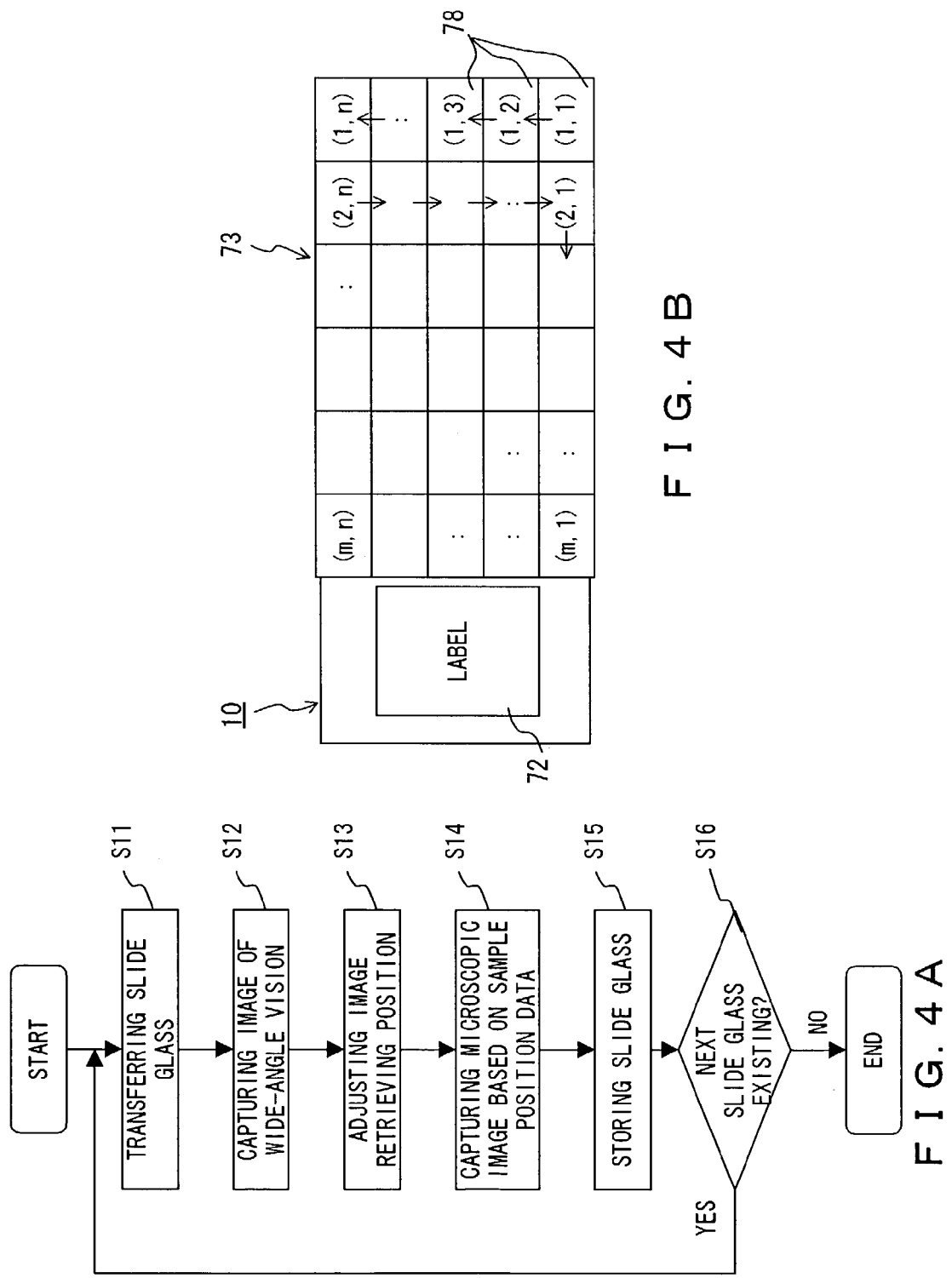
FIG. 4A is a flowchart for explanation of an operation of capturing a microscopic image according to the first embodiment of the present invention.
FIG. 4B shows a type of state of dividing the capturing area.

FIG. 4A is a flowchart for explanation of the operation of the process according to the first embodiment. FIG. 4B shows a type of state of capturing a microscopic image in the process operation.

In FIG. 4A, a slide glass is transferred (S11). In this process, the operator operates the keyboard 55 or the mouse 56 while watching the control screen displayed on the operation monitor 53, and retrieves any slide glass 10 from the slide glass storage unit 16.

Thus, under the control by the CPU 20, the specified slide glass 10 can be retrieved from the slide glass storage unit 16, and transferred to the space under the microscope objective lens 11 by the slide glass transfer unit 17 and the stage 9.

Then, an image of wide field-of-view of the entire slide glass 10 is taken (S12). This process is performed in synchronization with the transfer of the slide glass 10.

That is, the CPU 20 controls the transfer of the slide glass 10, and simultaneously controls the illuminating light source 75, the linear image sensor unit 60, and the analog-digital signal process device 61 shown in FIG. 2 so that the image of wide field-of-view of the entire slide glass 10 can be generated as described above by referring to FIG. 2, and displays the generated image of wide field-of-view on the operation monitor 53.

Then, the image retrieving position is adjusted (S13). In this process, the operator visually recognizes the entire image of the slide glass 10 displayed as an image of wide field-of-view on the operation monitor 53, and checks the sample position in the image. Then, the stage 9 is moved such that the checked sample position can match the capture position of a microscopic image.

Since an image of wide field-of-view of the slide glass 10 can be obtained during the transfer on the stage 9 and immediately displayed on the monitor, the operator can check the image of wide field-of-view displayed on the monitor, and immediately check the sample position on the slide glass 10 transferred on the stage 9. Based on the check, the sample position on the slide glass 10 can be quickly set as the capture position of a microscopic image.

The check of the sample position and the transfer to the capture position can be automatically recognized based on the data of the image of wide field-of-view obtained as described above, and the transfer to the capture position can be performed. If an image of wide field-of-view can be obtained in any method, the sample position can be automatically recognized based on the image of wide field-of-view as described in Japanese Patent Publication No. 2000-295462.

According to the present invention, since an image of wide field-of-view can be quickly obtained by transferring a slide glass to a space under the objective lens as described above, the sample position can also be automatically recognized quickly.

In any case, since the operation of setting the sample position on the slide glass is performed based on the image of wide field-of-view obtained in synchronization with the transfer of the slide glass, the operation of setting the sample position can be performed very quickly.

In adjusting the image retrieving position, the capture position on the slide glass 10 is divided into plural portions and set depending on the entire area and a capture magnification when the position of a sample to be captured is determined.

That is, since the smallest unit of vision for the capture on the slide glass can be determined based on the microscope objective lens 11, the intermediate magnification lens 13, and the size of the CCD of the camera unit 14, the capture position on the slide glass 10 is divided into plural portions based on the smallest unit of vision as a division reference.

FIG. 4B shows an example of obtaining and setting the plural capture portions. In this example, the entire area of the sample area 73 is set as a capture portion, and the entire capture portion is set as a plurality of sectional areas 78 identified by the position numbers (1, 1), (1, 2), . . . , (m, n). The sectional areas 78 can be set with adjacent portions overlapping. The method of overlapping and capturing the sectional areas is well known as described in Japanese Patent Publication No. 9-281405, etc.

As described above, when the sectional areas 78 are set by the position numbers (1, 1), (1, 2), . . . , (m, n), the sectional areas 78 are sequentially captured from the position number (1, 1) to the position number (m, n) (S14).

The amount of the dot image data of the captured image depends on a set resolution, but normally requires a data storage area of 1 gigabyte or more per piece of slide glass. In the present embodiment, such image data of a large capacity is sequentially stored on the large capacity storage medium 23.

When all capture positions, that is, the microscopic images in the sectional areas 78, are completely captured, the completely captured slide glass 10 is stored in the slide glass storage unit 19 (S15). This process is to store the captured slide glass 10 by the slide glass transfer unit 18 in the slide glass storage unit 19.

Then, it is determined whether or not there is another slide glass 10 to be image-captured remaining in the slide glass storage unit 16 (S16). This process is, although not shown in the attached drawings, to provide a slide glass detection sensor for the slide glass storage unit 16 to check whether or not there is another slide glass 10 remaining in the storage unit.

If there is another slide glass 10 in the determination (YES in S16), control is returned to S11, and the processes in S11 to S16 are repeated until there are no slide glasses 10 awaiting the image-capturing process in the slide glass storage unit 16. If it is confirmed that there are no slide glasses 10 remaining in the slide glass storage unit 16 (NO in S16), then the process terminates.

Thus, according to the first embodiment, when the slide glass 10 is transferred to the space under the objective lens, an image of wide field-of-view of the slide glass 10 is retrieved in synchronization with the transferring operation. Therefore, the operator can immediately recognize the sample position on the slide glass 10 on the monitor display screen of the obtained image of wide field-of-view, thereby adjusting and operating the settings of the capture area by quickly recognizing the capture area, and continuously and efficiently capturing microscopic images. Therefore, when microscopic images of a large number of slide glasses are to be captured as in the case of a large hospital, etc. where a large number of slide glasses are normally processed for detailed diagnostic of pathological samples, the necessary time can be considerably shortened, thereby improving the efficiency and convenience in capturing microscopic images.

FIG. 5 is a flowchart for explanation of the operation of the process of the control by the CPU 20 as the second embodiment of the microscopic image capture apparatus 1 with the basic configuration described above by referring to FIGS. 1 and 2.

In the operations of the processes shown in FIG. 5, the operations of the processes in S31, S33, S34, S35, S37, and S38 are the same as those in S11, S12, S13, S14, S15, and S16 shown in FIG. 4A. The operations of the processes in the flowchart shown in FIG. 5, only the operation of the process in S32 between S31 and S33, and the operation of the process in S36 between S35 and S37 are different from those in FIG. 4A.

In the processes according to the second embodiment, the slide glass 10 stored in the slide glass storage unit 16 has sample information recorded on its side using a dot matrix code, etc., for example, at least the slide glass information such as a slide glass management number, etc., the name of an internal organ sample, the sex of a sample organ provider, the age of the patient, the name of the hospital or facilities related to the sample, etc.

In the process shown in FIG. 5, after transferring the slide glass 10 in S31 and before capturing the image of wide field-of-view of the slide glass 10 in S33, the dot matrix code recorded on the side of the slide glass 10 is read by the dot matrix code reader 63 in S32.

Thus, in the second embodiment, while the slide glass 10 is transferred from the slide glass storage unit 16 until the image retrieving position is adjusted below the objective lens, not only an image of wide field-of-view can be captured but also at least the slide glass management number, and possibly various detailed sample information, etc. can be automatically read.

Then, after the read slide glass management number or sample information is captured together with the position numbers (1, 1) to (m, n) of the sectional areas 78 in S35 in the subsequent processes shown in FIG. 5, the information is stored as a record (or a file or a folder) in the database in the large capacity storage medium 23 so that the information can be internally processed and sorted as the information about the slide glass 10 by the CPU 20 in S36 before the slide glass 10 is stored in the slide glass storage unit 16 in S37.

A simpler method can be specifying a slide glass from a file name by associating the ID number of the slide glass with the microscopic image file name.

As described above, according to the second embodiment, since the sample information recorded on the slide glass in advance is read and retrieved, the digitized virtual data of the entire microscopic image captured from one slide glass is associated with the wide field-of-view image data and the sample information and put in a record (or a file or a folder), and can be stored as a database on a storage medium of a large capacity, thereby easily managing the wide field-of-view images on the captured slide glass, the microscopic image of the sample, and the sample information after associating them with one another. As a result, after capturing the sample image of the slide glass, desired image data can be called on the monitor display screen in a wireless system or through a cable to observe and evaluate the data in detail without observing the actual slide glass sample using a microscope.

FIG. 6 is a flowchart of the operation of the process of the control by the CPU 20 according to the third embodiment of the microscopic image capture apparatus 1 with the basic configuration described by referring to FIGS. 1 and 2.

In the operations of the processes shown in FIG. 6, the operations of the processes in S52 through S58 and S60 are the same as the operations of the processes in S31 through S37 and S38 in the operations of the processes shown in FIG. 5. In the operations of the processes in the flowchart shown in FIG. 6, only the operations of the processes in the first S51 and in S59 between S58 and S60 are different from those shown in FIG. 5.

In the present embodiment, the slide glass 10 stored in the slide glass storage unit 16 has sample information recorded on its side using a dot matrix code, etc., for example, sample information such as a slide glass management number, the name of an internal organ sample, the sex of a sample organ provider, the age of the patient, the name of the hospital or facilities related to the sample, etc., and the information as to whether or not the microscopic image of the slide glass has been captured in the similar dot matrix code or in any of other recording methods.

In the process shown in FIG. 6, it is first determined in S51 whether or not the first slide glass 10 stored in the slide glass storage unit 16 has the information (mark) indicating that the microscopic image has been captured. In this process, it is desired that the information (mark) indicating that the microscopic image has been captured can be read by the mark reader not shown in the attached drawings but provided in the slide glass storage unit 16 shown in FIG. 1. However, the operator can determine by visually checking the presence/absence of the information (mark).

When the information (mark) indicating that the microscopic image has been captured is read from the slide glass (YES in S51), control is immediately passed to step S60, and it is determined whether or not another slide glass is stored in the slide glass storage unit 16. If there is (YES in S60), then control is returned to step S51, and the process in S51 is repeated.

On the other hand, if the slide glass storage unit 16 stores another slide glass, and the slide glass has no record of the information (mark) indicating that the microscopic image has been captured, that is, no information can be read from the slide glass (NO in S51), then the process in S52 through S58 shown in FIG. 6, which are similar to the processes in S31 through S37 shown in FIG. 5, are performed, and the information (mark) indicating that the microscopic image has been captured is recorded on the slide glass by the captured image recording apparatus 66 in S59 before performing the process in S60.

The recording process can be performed by, for example, a recording device in the ink jet system or the ink thermal transfer system on the surface other than the sample position of the slide glass, for example, on the surface of a label, etc., or on the side of the slide glass. Otherwise, the similar process can be performed on the large capacity storage medium 23 by associating the information with various information about the slide glass (especially the ID number of the slide glass, etc.), referring to the contents of the database of the large capacity storage medium 23 when the slide glass is transferred from the slide glass storage unit 16, and checking the presence/absence of the information indicating that the microscopic image has been captured.

Thus, when the slide glass whose microscopic image has been captured is stored in the slide glass storage unit, the information indicating that the microscopic image has been captured is recorded directly on the slide glass or indirectly recorded on a storage medium as associated with the slide glass. Therefore, the wasteful operations and time of twice capturing a sample image mistakenly can be avoided, thereby improving the efficiency in capturing a microscopic image and the subsequent management.

The slide glass 10 can be transferred after providing an image recognition device comprising a wide-angle lens camera capable of capturing the entire slide glass by replacing the linear image sensor unit 60 shown in FIG. 1, and after capturing an image of wide field-of-view of the slide glass 10 in advance by the image recognition device.

Described below is the microscopic image capture apparatus according to the fourth through sixth embodiments of the present invention.

Figure 7:
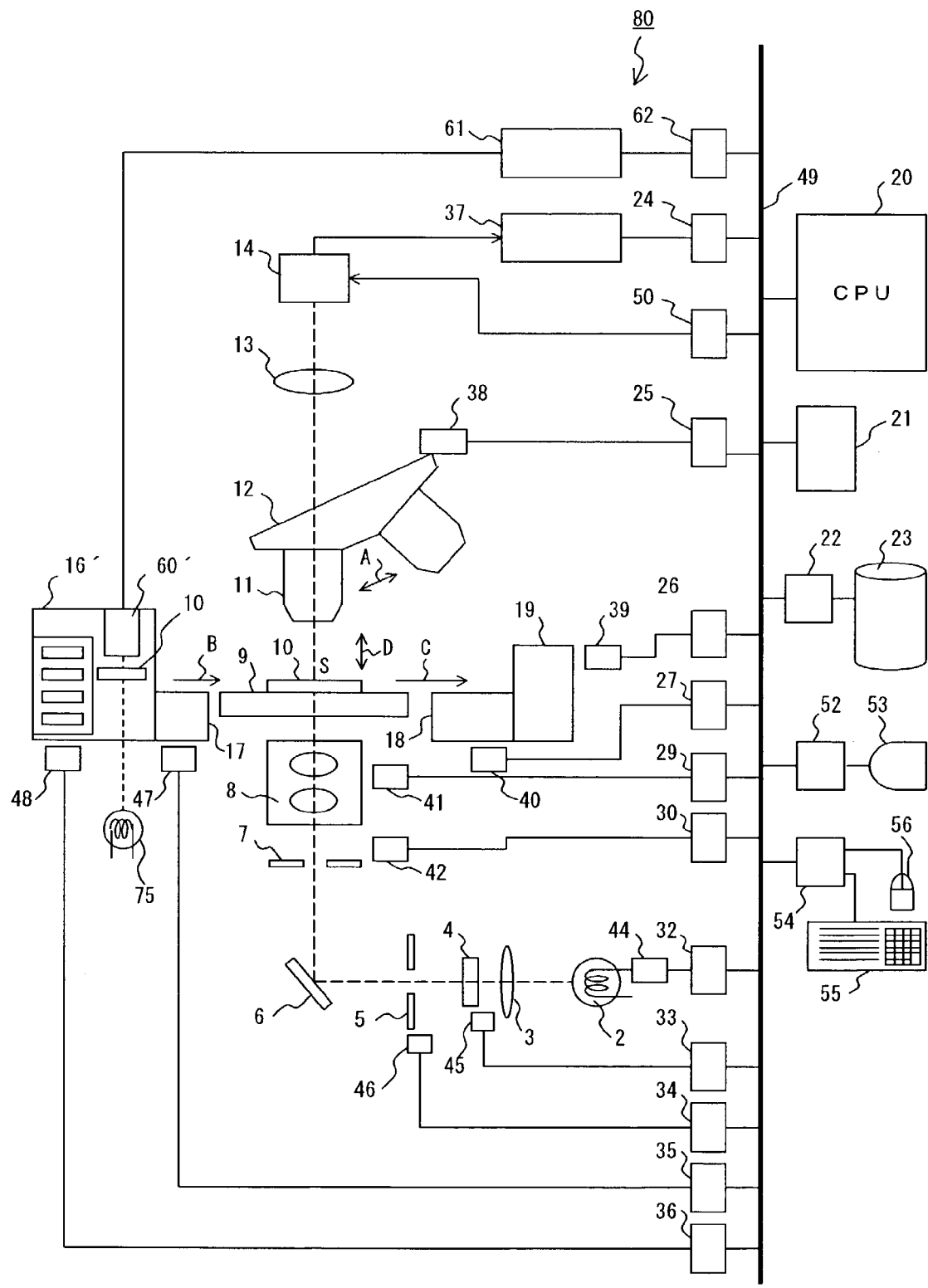
FIG. 7 shows the type of entire configuration of the microscopic image capture apparatus according to the fourth through sixth embodiments of the present invention.

FIG. 7 shows a type of entire configuration of the microscopic image capture apparatus according to the fourth through sixth embodiments of the present invention. A microscopic image capture apparatus 80 is designed by removing the dot matrix code reader 63, the code data process device 64, and the dot matrix code reader control I/F circuit 65 from the microscopic image capture apparatus 1 shown in FIG. 1.

In the microscopic image capture apparatus 80, the linear image sensor unit 60 is replaced with a wide field-of-view image capture camera unit 60', and the slide glass storage unit 16 is configured larger as a slide glass storage unit 16'. The enlarged portion stores the wide field-of-view image capture camera unit 60'.

Corresponding to the change in configuration, the illuminating light source 75 shown in FIG. 1 is set opposite the wide field-of-view image capture camera unit 60' by exchanging the positions of the illuminating light source 75 and the stage transfer unit driver 47 about the transfer path of the slide glass 10. Other configuration is the same as the configuration of the microscopic image capture apparatus 1 except the operation of the process by the CPU 20 described later.

The above mentioned wide field-of-view image capture camera unit 60' can capture an image of wide field-of-view of the slide glass 10 before the slide glass 10 is transferred from the slide glass storage unit 16' to the stage 9. In capturing the image of wide field-of-view, the entire image of the slide glass 10 including the sample S and the identification label 72.

After the slide glass 10 is captured as an image of wide field-of-view, it is observed under magnification through the microscope objective lens 11, transferred by the slide glass transfer unit 18, and stored in the other slide glass storage unit 19.

The control of the transfer of the slide glass 10 and the capture of the image of wide field-of-view is performed by the CPU 20. The CPU 20 loads a control program stored in, for example, the storage medium 22 into the memory 21, and controls each unit according to the loaded control program.

FIG. 8 is an oblique view showing the transfer of a slide glass with the above mentioned configuration, and a type of configuration of the main portion including the wide field-of-view image capture system. As shown in FIG. 8, the slide glass storage unit 16' is configured such that a plurality of slide glasses 10 (10-1, 10-2, 10-3, 10-4) can be stored in a slide glass tray 81.

A adsorptive device 82 for transfer in the storage unit is provided in the slide glass storage unit 16'. If an instruction to capture an image of wide field-of-view is issued, then the adsorptive device 82 for transfer in the storage unit retrieves one piece of the slide glasses 10 stored in the slide glass tray 81 using the adsorptive nozzle and the adsorptive pad at the tip, and moves it to a wide field-of-view image capture stage 83 as indicated by the arrow E by the broken lines.

The configuration and the transferring operation of the adsorptive device 82 for transfer in the storage unit are substantially the same as those of the transferring adsorptive device 68 shown in FIG. 2. In the present embodiment, the adsorptive device 82 for transfer in the storage unit operates in the slide glass storage unit 16'.

When the slide glass 10 transfers onto the wide field-of-view image capture stage 83, the illuminating light source 75 for an image of wide field-of-view is set below the slide glass 10 as opposite the wide field-of-view image capture camera unit 60' comprising a converging lens 84 and a wide field-of-view image capture camera 85 as shown in FIG. 7. The analog-digital signal process device 61 is connected to the wide field-of-view image capture camera unit 60'.

With the above mentioned configuration, the slide glass 10 is in the slide glass storage unit 16' and illustrated from below by the illuminating light source 75. The penetrated light from the illustrated slide glass 10 is collected by the converging lens 76, and the wide field-of-view image capture camera 85 captures the entire image of the slide glass 10.

An analog capture signal obtained from the capturing operation is transmitted to the analog-digital signal process device 61, the analog capture signal is converted into a digital capture signal by the analog-digital signal process device 61, and the converted digital capture signal is transmitted to the CPU 20 through the wide field-of-view image camera control I/F circuit 62 and the CPU bus 49. Thus, an image of wide field-of-view of the slide glass 10 is obtained in the slide glass storage unit 16'.

When the image of wide field-of-view is captured, the adsorptive device 82 for transfer in the storage unit returns the slide glass 10 to its original position on the slide glass tray 81. If an instruction to transfer the slide glass 10 to the stage 9 is issued, then the slide glass 10 is transferred to the stage 9 by an adsorptive device 86 for transfer which is provided separate from the adsorptive device 82 for transfer in the storage unit, and transfers the slide glass 10 in the F direction from the slide glass tray 81 as indicated by the arrow E.

Figure 9:
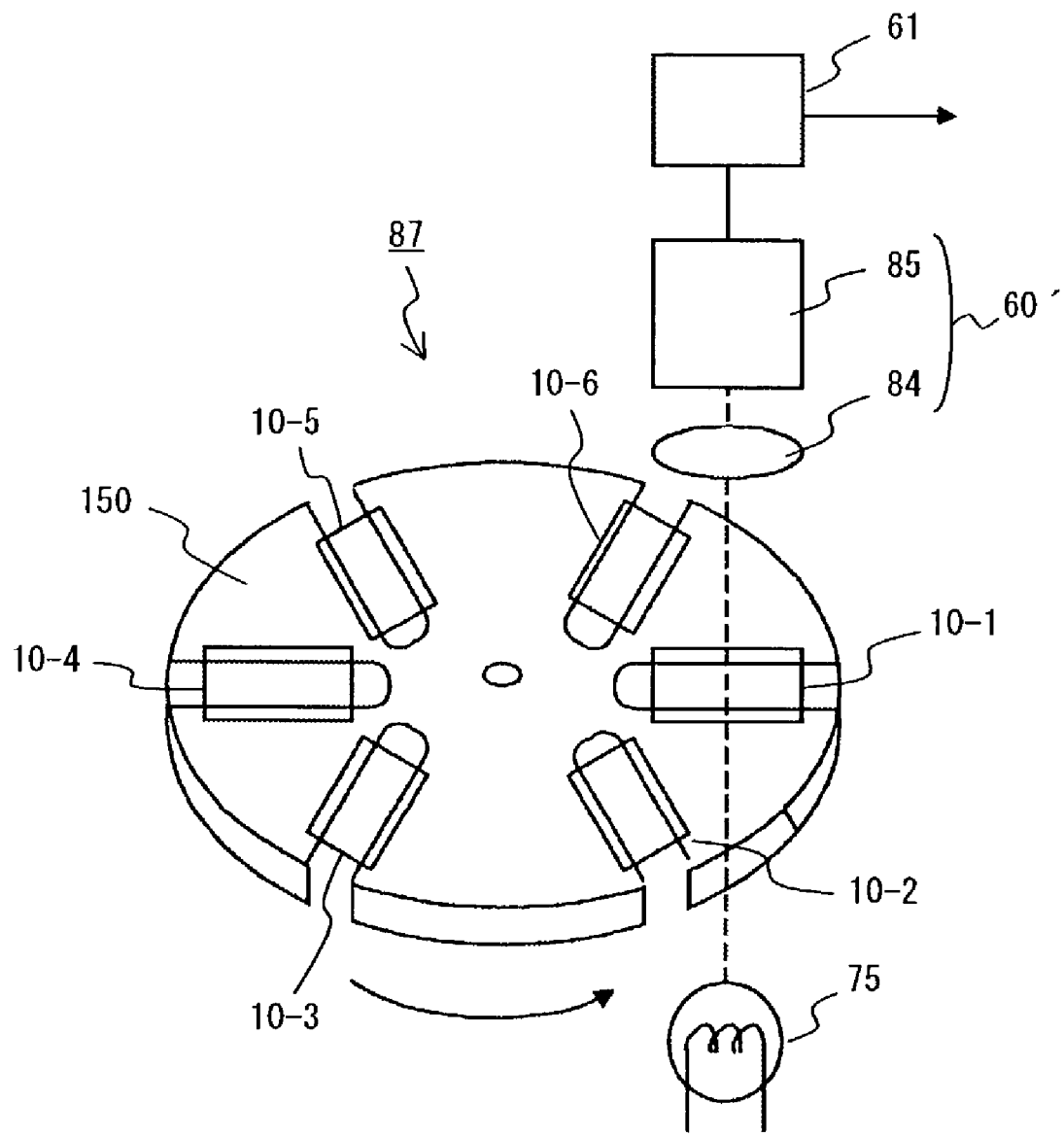
FIG. 9 shows another example of the configuration of a slide glass for easily capturing an image of wide field-of-view of the slide glass and easily transferring the slide glass.

FIG. 9 shows an example of another configuration of the slide glass tray for easily capturing an image of wide field-of-view of the slide glass 10 and transferring the slide glass 10. As shown in FIG. 9, a slide glass tray 87 is circular and can be rotated. With the configuration of the rotatable slide glass tray 87, the slide glasses 10 (10-1, 10-2, 10-3, . . . ) are stored as shown in FIG. 9. When the slide glass tray 87 is rotated, the images of wide field-of-view of the slide glasses 10 can be sequentially captured, and the slide glass 10 can be transferred to the stage 9.

Figure 10:
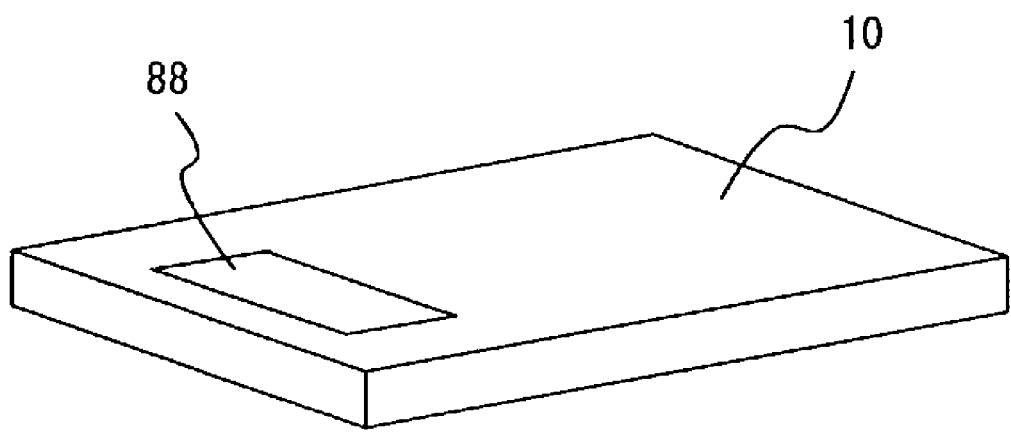
FIG. 10 is an oblique view of a slide glass according to the fourth through sixth embodiments of the present invention.

FIG. 10 is an oblique view of the slide glass 10 according to the fourth through sixth embodiments of the present invention. On the top surface of the slide glass 10, a label 88 is applied as shown in FIG. 10. The character data and bar code of the identification number, the name, etc. of the sample S are recorded on the label 88. The position of the label 88 is predetermined or marked for easy identification so that the label can be quickly detected from the entire image of the slide glass 10.

The character data of the identification number, name, etc. is character-recognized by an OCR, and stored as text data. A bar code is converted into text data by analyzing a bar code image data.

Figure 11:
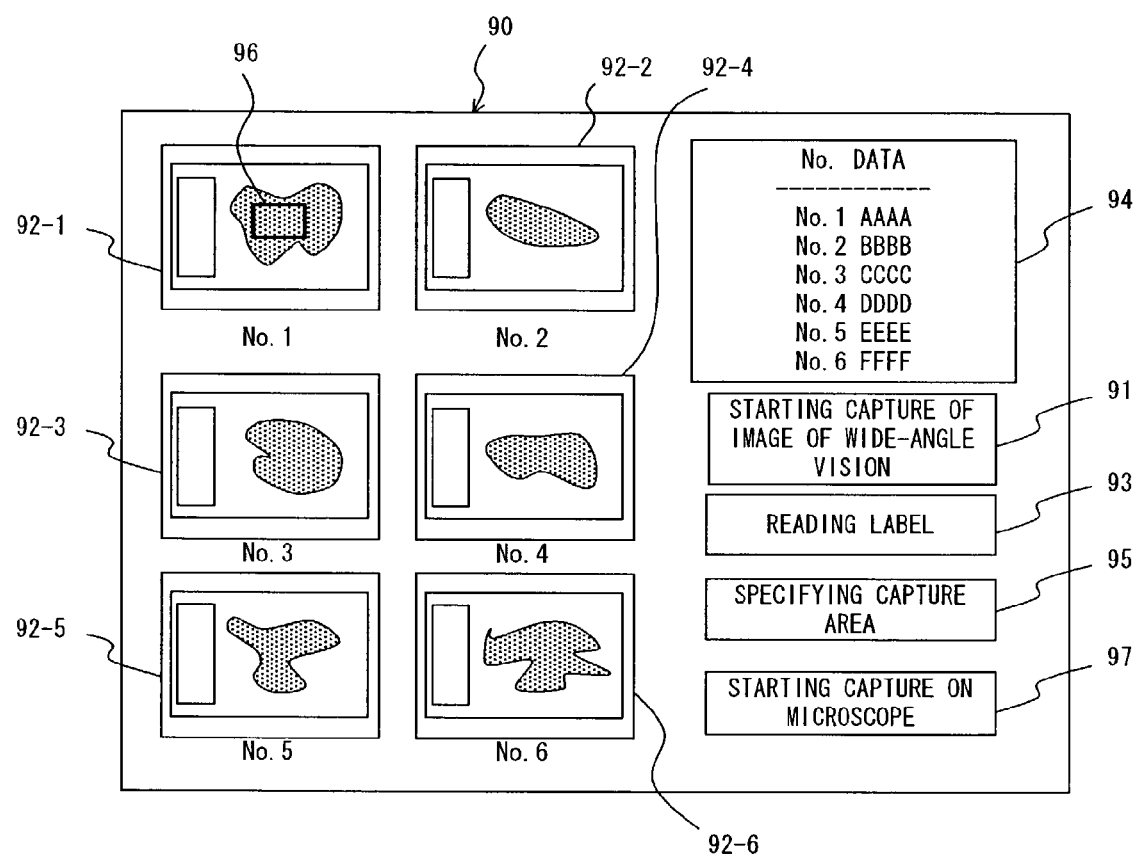
FIG. 11 shows an example of the configuration of the screen of a list of an image of wide field-of-view of the slide glass displayed on an operation monitor 53 according to the fourth through sixth embodiments of the present invention.

FIG. 11 shows an example of a configuration of the display screen of an image of wide field-of-view of a slide glass displayed on the operation monitor 53 in the fourth through sixth embodiments of the present invention. On an operating display screen 90 shown in FIG. 11, when a 'wide field-of-view image capture start' button 91 is pressed on the screen, the images of wide field-of-view of the slide glasses 10 stored in the slide glass tray 81 as shown in FIG. 8 are sequentially captured, all images of wide field-of-view of the slide glass 10 are taken, and the obtained wide field-of-view images 92 (92-1, 92-2, 92-3, . . . ) of the slide glass 10 are assigned the numbers (No. 1, No. 2, No. 3, . . . ) indicating the storage positions in the slide glass tray 81, and displayed in a list form.

When a 'label reading' button 93 is pressed, the label 88 is extracted from the image of wide field-of-view of the slide glass 10, the data is read therefrom, and the read data is displayed on a label data display unit 94.

When a 'capture area specification' button 95 is pressed, a capture area specification frame 96 for specification of a microscopic capture area is displayed on one of the displayed wide field-of-view images 92, for example, a wide field-of-view image 92-1. The position and the size of a capture area can be freely changed by the capture area specification frame 96. When a 'microscopic capture start' button 97 is pressed after determining the microscopic capture area, the slide glasses 10 are sequentially transferred to the stage 9, and the microscopic capture is performed.

When the microscopic capture is performed, the brightness possibly depends on the capture position of the slide glass 10. In this case, the CPU 20 controls the camera unit 14 to fix the exposure or correct the brightness level by software, thereby totally controlling the brightness condition.

Thus, all units of the microscopic image capture apparatus can be controlled by the CPU 20 by the operator of the microscopic image capture apparatus operating the screen using the keyboard 55 or the mouse 56 while checking the operating display screen 90 on the operation monitor 53.

The microscopic image capture apparatus according to the fourth through sixth embodiments with the above mentioned configuration is described below.

FIG. 12 is a flowchart of the operation of the process according to the fourth embodiment of the present invention. According to the embodiment, the images of wide field-of-view of all slide glasses 10 in the slide glass storage unit 16' are captured, and displayed on the operation monitor 53 in a list form. Then, the sample information is obtained.

When an operator presses the 'wide field-of-view image capture start' button 91 of the operating display screen 90 shown in FIG. 11 displayed on the operation monitor 53, the CPU 20 starts the process of capturing an image of wide field-of-view. That is, the CPU 20 first drives the adsorptive device 82 for transfer in the storage unit to retrieve the slide glass 10 from the slide glass tray 81 in the slide glass storage unit 16' (S01). In this process, the first slide glass 10-1 is retrieved in the first process period.

Then, the CPU 20 transfers the retrieved slide glass 10 to the wide field-of-view image retrieving position (S02). In this process, the slide glass 10 is placed on the wide field-of-view image capture stage 83.

Then, the CPU 20 captures an image of wide field-of-view of the slide glass 10 by the wide field-of-view image capture camera 85, obtains the image of wide field-of-view of the slide glass 10 (S03), and displays the image of wide field-of-view of the slide glass 10 on the screen (S04). Thus, as shown in FIG. 11, the image of wide field-of-view of the slide glass 10 is displayed on the operating display screen 90 of the operation monitor 53.

When the image is captured and displayed on the screen, the CPU 20 drives again the adsorptive device 82 for transfer in the storage unit, and returns the slide glass 10 whose image has been captured to its original position in the slide glass tray 81 (S05).

Then, the CPU 20 determines whether or not there is another slide glass 10, whose image of wide field-of-view is to be captured, remaining in the slide glass tray 81 of the slide glass storage unit 16' (S06). This process is to check whether or not there is a remaining slide glass 10 by providing a slide glass detection sensor (not shown in the attached drawings) in the slide glass tray 81.

If there is a slide glass 10 whose image of wide field-of-view is to be captured remaining in the slide glass tray 81 (YES in S06), then control is returned to S01, and the processes in S01 through S06 are repeated.

Thus, the images of wide field-of-view of all slide glasses 10 in the slide glass tray 81 are captured. In the determination in S06, when there are no slide glass 10, whose image of wide field-of-view is to be captured, remaining in the slide glass tray 81 (NO in S06), the process terminates.

Thus, the images of wide field-of-view of all slide glasses 10 in the slide glass tray 81 are sequentially displayed in a list form on the operating display screen 90 of the operation monitor 53 as shown in FIG. 11.

As described above, by retrieving the images of wide field-of-view of the slide glass 10 in the slide glass storage unit 16', and displaying them on the operating display screen 90 of the operation monitor 53, the sample information about the slide glass 10 stored in advance in the slide glass storage unit 16' can be obtained.

Figure 13:
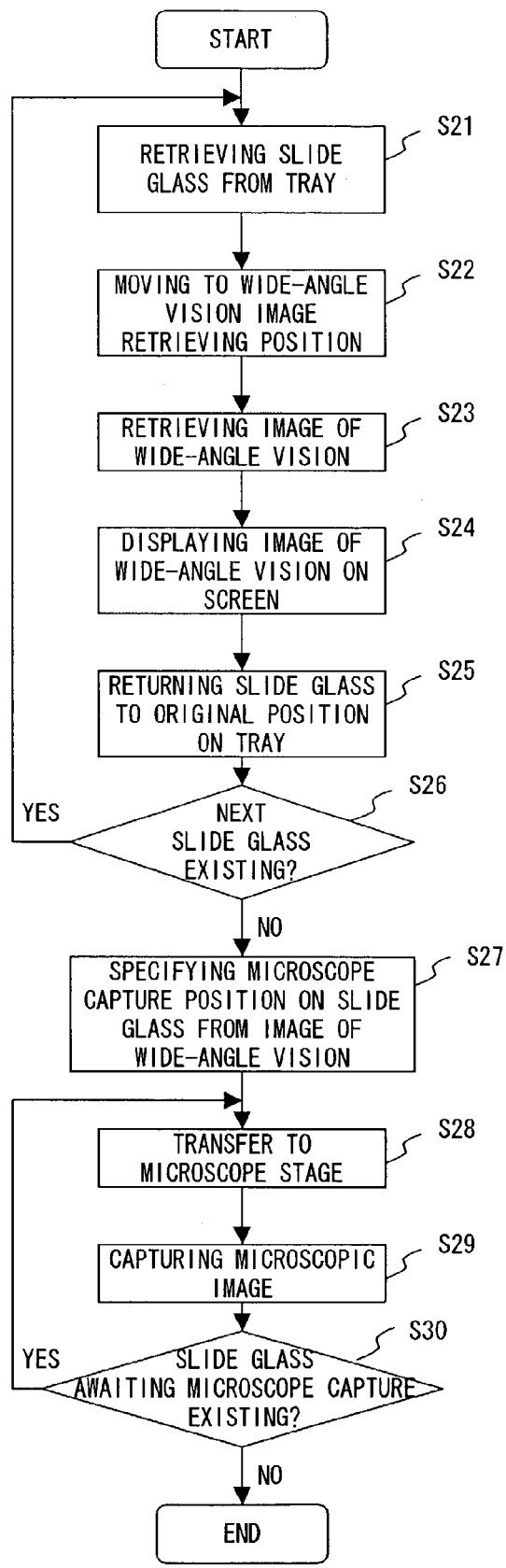
FIG. 13 is a flowchart of the operations processed according to the fifth embodiment of the present invention.

FIG. 13 is a flowchart of the operation of the process according to the fifth embodiment of the present invention. According to the present embodiment, the sample position on the slide glass 10 is obtained based on the image of wide field-of-view of the slide glass 10 captured in the slide glass storage unit 16', thereby determining the position in which a microscopic image is captured.

First, the processes in S21 through S26 in which the images of wide field-of-view of all slide glasses 10 are captured in the slide glass storage unit 16' are the same as the processes in S01 through S06 according to the fourth embodiment.

Then, the operator specifies the microscopic image capture position on the slide glass from the image of wide field-of-view (S27). In this process, the operator checks the sample position in the images of wide field-of-view on the slide glasses 10 by displaying the list of the images of wide field-of-view of the slide glasses 10, and the area where a microscopic image is to be captured is specified as described above about the capture area specification frame 96 shown in FIG. 11.

The area where, a microscopic image is to be captured can be specified according to the technology of Japanese Patent Publication No. 2000-295462, that is, the sample position can be automatically extracted from the images of wide field-of-view. In this process, when the capture area of a sample is determined, the capture position on the slide glass 10 is divided into plural portions depending on the area of the entire sample and the magnification for the capture.

That is, since the smallest unit of vision for the capture on the slide glass 10 can be determined based on the microscope objective lens 11, the intermediate magnification lens 13, and the size of the CCD of the camera unit 14, the capture position on the slide glass 10 is divided into plural portions based on the smallest unit of vision as a division reference.

Figure 14:
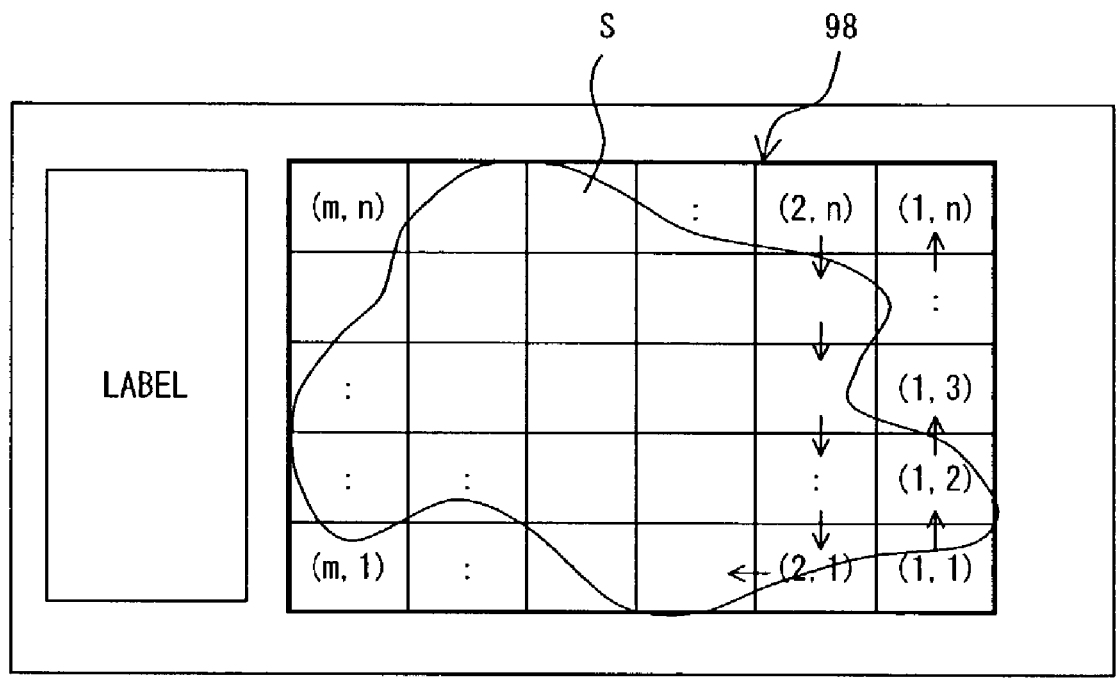
FIG. 14 shows an example of dividing and setting the captured portion of a sample on a slide glass 10 in the operations performed according to the fifth embodiment of the present invention.

FIG. 14 shows an example of setting a plurality of divided portions of the sample of the slide glass 10 as described above. In the example shown in FIG. 14, all areas of an area 98 containing the sample S is set as a capture portion, and the entire capture portion is divided into a plurality of portions indicated by the position numbers (1, 1), (1, 2), . . . , (m, n), and a capture area corresponding to the smallest unit of vision is set.

The capture area of each section can be set such that adjacent portions can be overlapped. The method of capturing overlapped images is well known and described in Japanese Patent Publication No. 9-281405, etc.

When the 'microscopic capture start' button 97 of the operating display screen 90 shown in FIG. 11 is pressed after the processes above, the CPU 20 allows the slide glass transfer unit 17 to transfer the slide glass 10 to the stage 9 (S28). Then, the capture of a microscopic image is started (S29).

In the microscopic image capturing process, if the capture area is set by the capture position numbers (1, 1), (1, 2), . . . (m, n) as shown in FIG. 14, then the capture area is sequentially captured in order from the position number (1, 1) to the position number (m, n). The amount of capture data depends on the resolution set when the capturing process is performed, but normally requires a data storage area of 1 gigabyte or more. According to the present embodiment, the image data of a large capacity is sequentially stored as a database in the large capacity storage medium 23.

When a microscopic image in all capture positions, that is, the capture area divided the position numbers (1, 1), (1, 2), . . . (m, n) is completely captured, the slide glasses 10 on which the capturing process has been performed are stored in the slide glass storage unit 19.

Then, it is determined whether or not the slide glass 10 on which the next microscopic image capturing process is to be performed is in the slide glass storage unit 16' (S30). Also in this process, the slide glass detection sensor not shown in the attached drawings is used.

When another slide glass 10 whose microscopic image is to be captured next is detected in the slide glass tray 81 (YES in S30), control is returned to S28, and the processes in S28 through S30 are repeated.

Thus, the microscopic images of all slide glasses 10 in the slide glass tray 81 are captured. If there are no slide glasses 10 whose microscopic images are to be captured remaining in the slide glass tray 81 in the determination in S30, then the process terminates.

As described above, by checking in advance the sample position on the slide glass 10 in the slide glass storage unit 16', the position on the slide glass 10 to be captured can be immediately set under the microscope objective lens 11 when the slide glass 10 is placed under the microscope objective lens 11, thereby shortening the time required to capture a microscopic image and improving the operability.

According to the present embodiment, the images of wide field-of-view are collectively captured with all slide glasses 10 stored in the slide glass storage unit 16'. However, each image of wide field-of-view can be captured when the slide glass 10 is stored in the slide glass storage unit 16'. Also in this method, the time required in capturing all microscopic images can be shortened.

Figure 15:
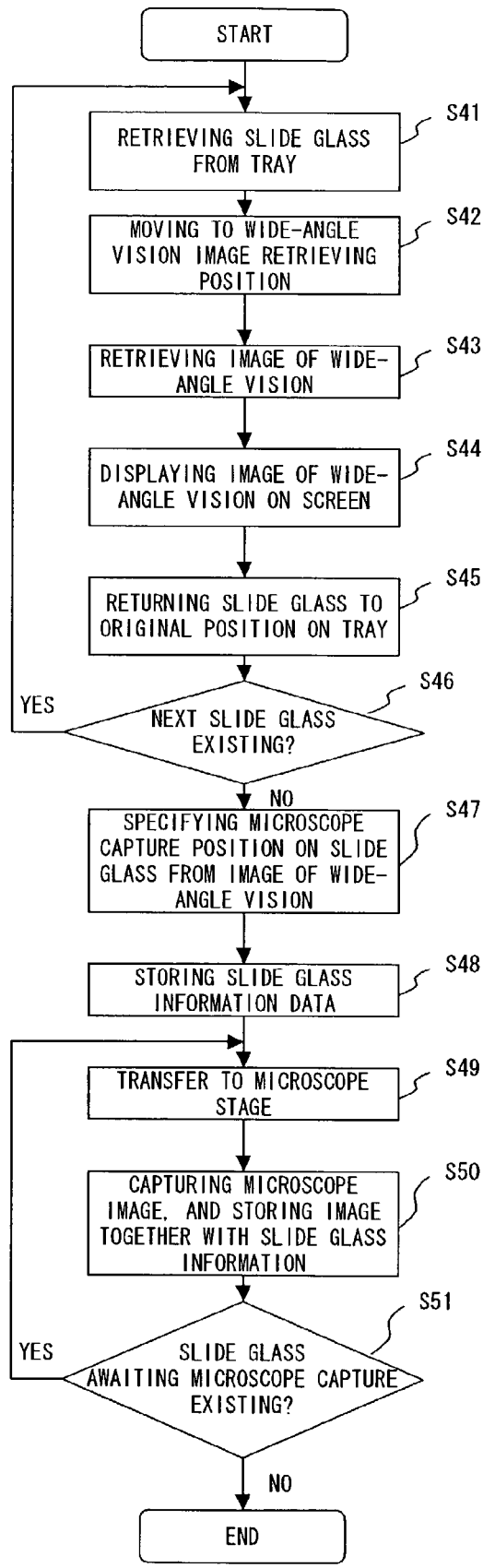
FIG. 15 is a flowchart of the operations processed according to the fifth embodiment of the present invention.

FIG. 15 is a flowchart of the operation of the process according to the sixth embodiment. In the present embodiment, the sample information recorded on the label 88, etc. on the slide glass 10 is obtained based on the images of wide field-of-view captured in the slide glass storage unit 16', and stored together with a captured sample image in the memory device.

The processes in S41 through S46 of capturing images of wide field-of-view of all slide glasses 10 in the slide glass storage unit 16' are the same as the processes in S01 through S06 in the fourth embodiment and in S21 through S26 in the fifth embodiment.

According to the present embodiment, the CPU 20 reads sample information data recorded on the label 88 from the images of wide field-of-view of the slide glasses 10 by pressing the 'label reading' button 93 on the operating display screen 90 of the operation monitor 53 (S47). In this process, the read sample information data is displayed on the label data display unit 94 of the operating display screen 90 as shown in FIG. 11.

The above mentioned sample information such as the ID of the slide glass 10, the sample name, etc. is recorded in advance using characters, bar codes, etc.

After the process above, the CPU 20 stores the read sample information data in the storage medium 22 as associated with, for example, the position number, etc. of the slide glass 10 (S48). The sample information data reading process can also be automatically performed in synchronization with the capture of the above mentioned images of wide field-of-view.

When the operator presses the 'microscopic capture start' button 97 on the operating display screen 90 of the operation monitor 53, the CPU 20 starts capturing microscopic images. The repeated processes in S49 through S51 shown in FIG. 51 in the process of capturing microscopic images are substantially the same as the repeated processes in S28 through S30 according to the fifth embodiment. However, in the process S50 according to the present embodiment, a captured microscopic image is recorded in one folder as the information about a piece of slide glass 10 together with the sample information data stored in the storage medium 22 in process S48.

The ID number of the slide glass 10 recorded on the label 88 can be assigned to the microscopic image file of the slide glass 10 so that the sample information data of the slide glass 10 can be linked to the microscopic image file, thereby recording the information as separate databases.

As described above, by capturing an image of wide field-of-view of the slide glass 10 in the slide glass storage unit 16' and obtaining the sample information and sample information, microscopic images of a plurality of slide glasses can be efficiently captured, and the microscopic images can be quickly recorded on a storage medium together with the sample information, thereby efficiently and centrally managing the microscopic images and the sample information.

DESCRIPTION OF SYMBOLS

1 Microscopic image capture apparatus
2 Transmitted illumination light source
3 Collector lens
4 Filter
5 Field stop
6 Mirror
7 Aperture stop
8 Condenser lens unit
9 Stage
10 Slide glass
11 Objective lens
12 Revolver
13 Intermediate magnification lens
14 Camera unit
16, 16', 19 Slide glass storage units
17, 18 Slide glass transfer units
20 CPU
21 Memory
22 Storage medium such as a hard disk
23 Large capacity storage medium
24 Image process board control I/F circuit
25 Revolver control I/F circuit
26 Slide glass storage control I/F circuit
27 Stage transfer control I/F circuit
29 Condenser unit control I/F
30 Aperture stop control I/F circuit
32 Light source control I/F circuit
33 Filter control I/F circuit
34 Field stop control I/F circuit
35 Slide glass transfer control I/F circuit
36 Slide glass storage control I/F circuit
37 Image process board
38 Revolver turning driver
39 Slide glass storage unit driver
40 Stage transfer unit driver
41 Condenser lens driver
42 Aperture stop driver
44 Analog voltage value change circuit
45 Filter control driver
46 Field stop driver
47 Stage transfer unit driver
48 Slide glass storage unit driver
49 CPU bus
50 Camera unit control I/F circuit
52 Screen display memory
53 Operation monitor
54 Keyboard/mouse control I/F circuit
55 Keyboard
56 Mouse
60 Linear image sensor unit
60' Wide field-of-view image capture camera unit
61 Analog-digital signal processing device
62 Wide field-of-view image camera control I/F circuit
63 Dot matrix code reader
64 Code data process device
65 Dot matrix code reader control I/F circuit
66 Captured image recording apparatus
67 Captured image record control I/F circuit
68 Transferring adsorptive device
69 Stage adsorptive device
71 Adsorptive portion moving guide hole
72 Identification label
73 Sample area
74 Dot matrix code
75 Illuminating light source
76 Converging lens
77 Linear image sensor
78 Sectional areas
80 Microscopic image capture apparatus
81 Slide glass tray
82 Adsorptive device for transfer in a storage unit
83 Wide field-of-view image capture stage
84 Converging lens
85 Wide field-of-view image capture camera
86 Adsorptive device 86 for transfer
87 Rotating slide glass tray
88 Label
90 Operating display screen
91 Wide field-of-view image capture start button
92 (92-1, 92-2, 92-3, . . . ) Wide field-of-view images of slide glass
93 Label reading button
94 Label data display unit
95 Capture area specification button
96 Capture area specification frame
97 Microscopic capture start button
98 Sample capture area

What is claimed is:

1. A microscopic image capture apparatus, comprising:
   a slide glass transfer unit which transfers a slide glass from a first slide glass tray unit to a space under a microscope objective lens having a high magnification;
   a wide field-of-view image capture unit which includes a linear image sensor and an objective lens having a low magnification, and which generates a wide field-of-view image of the entire slide glass in synchronization with the transfer of the slide glass by sequentially capturing linear images of the slide glass;

a microscopic image capture unit which: (i) automatically recognizes a position of a sample on the slide glass based on the wide field-of-view image of the entire slide glass the wide fiel-of-view image capture unit, (ii) divides an entire capture area of the sample into a plurality of sections, and (iii) captures a microscopic image of each of the sections using the microscope objective lens having the high magnification, so as to a capture microscopic image of the sample; and a slide glass storage unit which stores the slide glass from the space under the microscope objective lens into a second slide glass tray unit after the microscopic image of the sample on the slide glass has been captured by the microscopic image capture unit.

2. The apparatus according to claim 1, wherein:

the first slide glass tray unit and the second side glass tray unit are configured as one unit, and the slide glass transfer unit and the slide glass storage unit are also configured as one unit.

3. The apparatus according to claim 1, further comprising:

a sample information reading unit which reads sample information recorded on the slide glass in synchronization with the transfer of the slide glass; and an image and sample information storage unit which sorts and stores the microscopic image of the sample captured for each slide glass by the microscopic image capture unit and the sample information read from each slide glass, so as to be associated with each other, respectively.

4. The apparatus according to claim 3, wherein:

the sample information is recorded on a side of the slide glass.

5. The apparatus according to claim 3, wherein:

the sample information comprises a management number of the slide glass.

6. The apparatus according to claim 3, wherein:

the sample information indicates whether or not the microscopic image of the sample on the slide glass has been captured.

7. The apparatus according to claim 6, wherein:

if sample information indicating that a microscopic image has been captured is recorded on a slide glass, the slide glass is not transferred to the microscopic image capture unit.

8. The apparatus according to claim 3, further comprising:

an image capture information recording unit which records information for identification of the slide glass which is stored in the second slide glass tray unit, the microscopic image of the sample on said slide glass having been captured.

9. The apparatus according to claim 1, further comprising:

an image capture information recording unit which records information for identification of the slide glass which is stored in the second slide glass tray unit, the microscopic image of the sample on said slide glass having been captured.

10. A microscopic image capture method, comprising:

transferring a slide glass from a first slide glass tray unit to a space under a microscope objective lens having a high magnification;

capturing a wide field-of-view image of the entire slide glass by seguentially capturing linear images of the slide glass via an objective lens having a low magnification, in synchronization with the transfer of the slide glass;

automatically recognizing a position of a sample on the slide glass based on the wide field-of-view image of the entire slide glass, dividing an entire capture area of the sample into a plurality of sections, and capturing a microscopic image of each of the sections using the microscope objective lens having the high magnification, so as to capture a microscopic image of the sample; and storing the slide glass from the space under the microscope objective lens into a second slide glass tray unit after the microscopic image of the sample on the slide glass has been captured.

11. The method according to claim 10, wherein:

the first slide glass tray unit and the second slide glass tray unit are configured as one unit, and the slide glass transfer and the slide glass storage are performed in one configuration.

12. The method according to claim 10, further comprising:

reading sample information recorded on the slide glass in synchronization with the slide glass transfer; and sorting and storing the microscopic image of the sample captured for each slide glass and the sample information read from each slide glass, so as to be associated with each other, respectively.

13. The method according to claim 10, further comprising:

recording information indicating that the microscopic image of the sample on the slide glass has been captured when the slide glass is stored.

14. The method according to claim 13, wherein:

if sample information indicating that a microscopic image has been captured is recorded on a slide glass, the slide glass is not transferred for capturing a microscopic image.

15. A computer readable medium having a computer program stored thereon that is executable by a computer to cause the computer to control capturing of a microscopic image via a microscopic image capturing apparatus, said program being executable by the computer to cause the computer to control the microscopic image capturing apparatus to perform functions comprising:

transferring a slide glass from a first slide glass tray unit to a space under a microscope objective lens having a high magnification;

capturing a wide field-of-view image of the entire slide glass by sequentially capturing linear images of the slide glass via an objective lens having a low magnification, in synchronization with the transfer of the slide glass;

automatically recognizing a position of a sample on the slide glass based on the wide field-of-view image of the entire slide glass, dividing an entire capture area of the sample into a plurality of sections, and capturing a microscopic image of each of the sections using the microscope objective lens having the high magnification, so as to capture a microscopic image of the sample; and storing the slide glass from the space under the microscope objective lens into a second slide glass tray unit after the microscopic image of the sample on the slide glass has been captured.

16. The computer readable medium according to claim 15, wherein said program is executable by the computer to cause the computer to control the microscopic image capturing apparatus to perform further functions comprising:

reading sample information recorded on the slide glass in synchronization with the transfer of the slide glass; and sorting and storing the microscopic image of the sample captured for each slide glass and the sample information read from each slide glass, so as to be associated with each other, respectively.

17. The computer readable medium according to claim 15, wherein said program is executable by the computer to cause the computer to control the microscopic image capturing apparatus to perform further functions comprising:

recording information indicating that the microscopic image of the sample on the slide glass has been captured when the slide glass is stored.

* * * * *